Nov. 11, 1958    E. J. DIEBOLD    2,860,301
COMMUTATING REACTOR BREAK PRE-EXCITATION
FOR MECHANICAL RECTIFIERS
Filed April 15, 1954    6 Sheets-Sheet 1

INVENTOR.
EDWARD JOHN DIEBOLD
BY
Ostrolenk & Faber
ATTORNEYS

INVENTOR.
EDWARD JOHN DIEBOLD
BY
ATTORNEYS

Nov. 11, 1958

E. J. DIEBOLD 2,860,301

COMMUTATING REACTOR BREAK PRE-EXCITATION
FOR MECHANICAL RECTIFIERS

Filed April 15, 1954

INVENTOR
EDWARD JOHN DIEBOLD

BY

Ostrolenk & Faber

ATTORNEYS

Nov. 11, 1958     E. J. DIEBOLD     2,860,301
COMMUTATING REACTOR BREAK PRE-EXCITATION
FOR MECHANICAL RECTIFIERS Filed April 15, 1954     6 Sheets-Sheet 5

INVENTOR.
EDWARD JOHN DIEBOLD
BY
Ostrolenk & Faber
ATTORNEYS

Nov. 11, 1958 E. J. DIEBOLD 2,860,301
COMMUTATING REACTOR BREAK PRE-EXCITATION
FOR MECHANICAL RECTIFIERS
Filed April 15, 1954 6 Sheets-Sheet 6

INVENTOR.
EDWARD JOHN DIEBOLD
BY
Osterlenk & Faber
ATTORNEYS

United States Patent Office 2,860,301
Patented Nov. 11, 1958

2,860,301

COMMUTATING REACTOR BREAK PRE-EXCITATION FOR MECHANICAL RECTIFIERS

Edward John Diebold, Ardmore, Pa., assignor to I-T-E Circuit Breaker Company, Philadelphia, Pa., a corporation of Pennsylvania Application April 15, 1954, Serial No. 423,357

17 Claims. (Cl. 321—48)

My invention relates to mechanical rectifiers and is more particularly directed to the pre-excitation of the commutating reactors for mechanical rectifier.

In my copending application Serial No. 212,017, filed February 21, 1951, now Patent No. 2,693,569, I described another preexcitation circuit for mechanical rectifiers, including a compensation for the non-linear hysteresis loop. This copending application applies to mechanical rectifiers with three-phase bridge circuits in which the commutating reactors operate in both ways, i. e., in the positive and in the negative direction. Output voltage control of such rectifiers is effected by rotating the synchronous motor of the mechanism, as shown in my copending application Serial No. 331,467, filed January 15, 1953, now Patent No. 2,814,444, on a regulator for mechanical rectifiers.

My present invention relates to mechanical rectifiers in which the current through the commutating reactor is the current of only one contact, i. e., a single way current. Mechanical rectifier circuits having such series connection of commutating reactor and contact are actually more varied and, therefore, have more applications than the one described in my copending patent application Serial No. 212,017, filed February 21, 1951. The desirability of such circuits is shown for example in my copending applications Serial No. 361,670, filed June 15, 1953, now Patent No. 2,811,687, and Serial No. 361,669, filed June 15, 1953.

A further well known circuit will hereinafter be described and illustrated to show further examples of the application of my instant invention.

The pre-excitation of the commutating reactors and their control under all circumstances has been the major obstacle in the application of many circuits for mechanical rectifiers. The present invention permits the application of desirable mechanical rectifier circuits by providing a satisfactory pre-excitation for their commutating reactors and also a possibility of voltage control by magnetic means, as is described in my copending application Serial No. 423,358, filed: April 15, 1954, now Patent No. 2,817,805.

The problems of a mechanical rectifier which I am trying to solve are as follows:

(1) When a contact of the mechanical rectifier is closed, the core of the commutating reactor connected to it should be in a state of magnetization which provides a satisfactory make step, i. e., a make step current of low enough magnitude, to prevent damage to the contacts.

(2) After the contact has been closed for the full time required to carry the current, then it should be opened. To open the contact, the core of the commutating reactor associated with the opening contact should go through a break step. The step current of this break step should be small and positive and the break step itself should be of sufficient length to permit correct opening of the contacts under all circumstances.

(3) In the interval between the opening of the contact and the next succeeding closing of the same contact, the commutating reactor core associated with it should be reversed in its magnetic flux, at least partially. The amount of flux reversal of the commutating reactor core will determine, at the subsequent closing of the contact, the amount of voltage drop taken by the commutating reactor which provides for the voltage control of the mechanical rectifier output. This is identical with the operation of a magnetic amplifier.

The different duty which must be performed by the core of any one commutating reactor during each and every cycle of its operation is contradictory. In the case 1, positive bias of unvarying magnitude is required. In the case 2, a negative bias current, variable in time and depending on the condition of operation, is required. In the case 3, a positive bias current of variable magnitude and variable duration is required independent of the conditions of operation but depending on the desired voltage control of the mechanical rectifier.

Attempts to fulfill, by one circuit, three different conditions, the first two of which are invariable and the third being variable, have always failed. A compromise was necessary, leading either to insufficient voltage control or excess wear on the contacts due to improper pre-excitation. The problem, therefore, can be stated as trying to satisfy three different conditions by means of only one core within the short interval of only one cycle.

SOLUTION OF THE PROBLEM PRINCIPLE

It is possible to solve the above mentioned problem because the three parts of the operations which occur in the same commutating reactor core once during each cycle do not have to occur at the same time. It will hereinafter be described how the time sequence of these events follows and that it is possible to keep them apart at all times. The solution consists of providing three different circuits influencing the same commutating reactor core at subsequent times and never simultaneously.

Each of these circuits influences the core of the commutating reactor by means of a winding around it. The correct solution for any separate circuit requires that the winding carries the current only when it must influence the commutating reactor core and carries a negligible or zero current during the rest of the time. The problem, therefore, has been changed into the provision of pre-excitation and control circuits carrying a substantial amount of current only for a short time and carrying no current during most of the time of one cycle.

My present invention deals with a break pre-excitation circuit. It provides the correct amount of break pre-excitation current and straightener current in the commutating reactor of a mechanical rectifier but only during the time that a break of the contact might occur keeping the pre-excitation and straightener current equal to zero during all other times. This permits the correct use of a separate independent flux reversal circuit, described in my copending application Serial No. 423,358, filed April 15, 1954, and a make pre-excitation circuit.

Accordingly, a primary object of my invention is to provide a novel commutating reactor break pre-excitation circuit for a mechanical rectifier.

Another object of my invention is to provide a three phase one way rectifier with a break pre-excitation circuit for the commutating reactor.

A still further object of my invention is to provide a break pre-excitation circuit for a mechanical rectifier so that the step is of short duration and positive but also a sufficient duration to permit correct opening of the contacts under all circumstances.

Still another object of my invention is to provide a one way mechanical rectifier circuit with a break pre-excitation circuit for the commutating reactor which circuit is separate and independent of a flux reversal circuit and a make pre-excitation circuit.

Another object of my invention is to provide a break pre-excitation circuit for the commutating reactor of a mechanical rectifier which will prevent the flow of negative current.

These and other objects of my invention will be apparent from the description when taken in connection with the drawings in which:

Figures 2a, 2b, 2c, 2d and 2e illustrate the voltage, current, and flux condition in the mechanical rectifier circuit. These figures are all drawn on the same time axis and are as follows.

Figure 4 shows a series of current and voltage curves illustrating the conditions existing in the circuit of Figure 3.

Figure 6 illustrates the voltage and current conditions of the circuit shown in Figure 5.

Figures 8 to 14 are oscillographs of pre-excitation for mechanical rectifiers.

I. Operation of the mechanical rectifier

Figure 1:
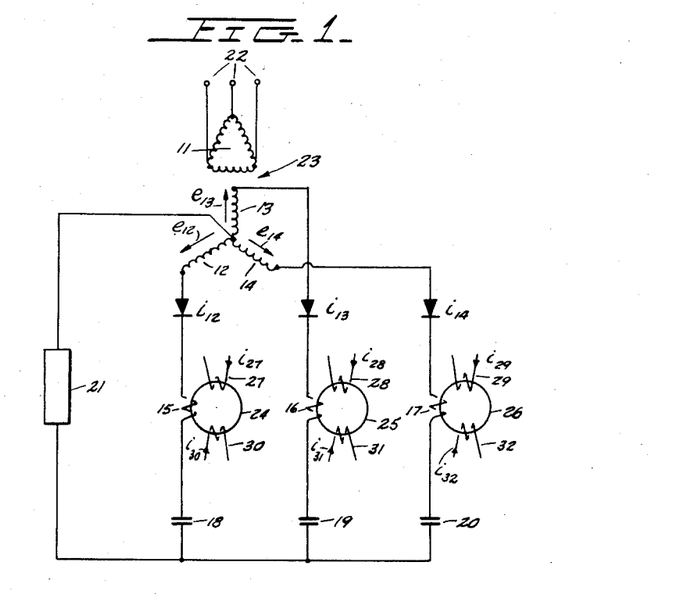
Figure 1 is a mechanical rectifier circuit diagram illustrating a basic three phase one way rectifier to which my novel commutating reactor break pre-excitation circuit can be applied.

From the many circuits which can be adapted with a voltage control circuit of my invention, I have illustrated a basic circuit in Figure 1.

Figure 1 is a simple mechanical rectifier circuit for three-phase one-way rectification, a source of three-phase A.-C. power 22 is connected to a three phase transformer 23 which has a delta connected primary 11 and a star connected to the commutating reactor coils 15, 16 and 17 which are then connected to the contacts 18, 19 and 20 which feed the load 21. The commutating reactor cores 24, 25 and 26 also have the auxiliary windings 27, 28, 29 and 30, 31, 32 wound thereon.

The object of my invention is to provide a break pre-excitation current through the windings 27, 28 and 29 which does not disturb the make of the contact of the mechanical rectifier or the flux reversal accomplished with the windings 30, 31 and 32.

Figure 2 shows the voltage, current and flux diagrams of the mechanical rectifier circuit shown in Figure 1. In Figure 2a, the three-phase voltages $e_{12}$, $e_{13}$, $e_{14}$ of the three windings 12, 13 and 14 of the main transformer 23 are shown. Figure 2b shows the three phase currents $i_{12}$, $i_{13}$, $i_{14}$ flowing through the transformer windings 12, 13 and 14, commutating reactor coils 15, 16 and 17 and the contacts 18, 19 and 20. Figure 2c shows the flux $F_{24}$ of the commutating reactor core 24. Figure 2d shows the current $i_{12}$ as shown in Figure 2b but now with the addition of the break pre-excitation current $i_{27}$ and the flux reversal current $i_{30}$. Figure 2e shows the same current $i_{12}$ for the condition of low overlap $i_{12L}$ and the condition of high overlap $i_{12H}$. These currents are the same current as shown in Figure 2b or 2d, only for different type operation. At the bottom of Figure 2 is a common time scale for all the Figures 2a, 2b, 2c, 2d and 2e.

Figure 2A:
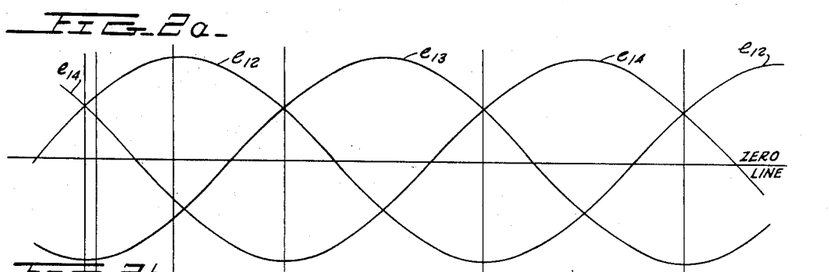
Figure 2a is a voltage time representation of the voltage on the secondary windings of the main transformer.
Figure 2B:
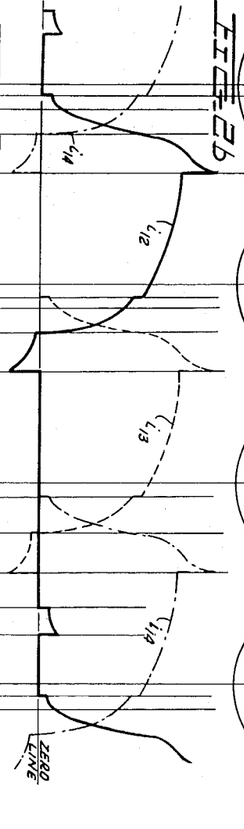
Figure 2b is a current-time representation of the current $i$ in the secondary windings of the main transformer.

Considering the current in one phase of Figure 1, that is, the current $i_{12}$ in phase 12, as shown in Figure 2b, it is initiated at the time $t_1$ when the contact 18 closes. The rise of the current is prevented by the make step of the core 24 and the current starts rising quickly only after this core is saturated at the time $t_2$.

Figure 2C:
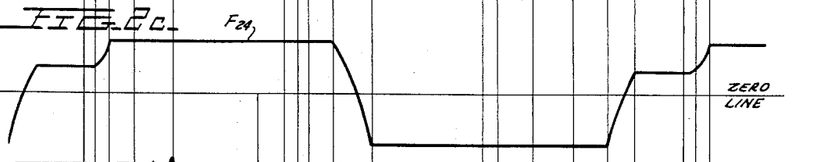
Figure 2c is a flux-time representation of the flux in the commutating reactor.

On Figure 2c is shown that this delay in the rise of current is due to a change of the flux $F_{24}$ occurring between the times $t_1$ and $t_2$. At the time $t_2$, the core 24 is saturated and, therefore, the flux $F_{24}$ has assumed its maximum value. Henceforth, until the current $i_{12}$ reaches zero, the core 24 will stay saturated.

After the time $t_2$, the current $i_{12}$ can rise freely and rises to a large value until the time $t_3$. At this time, the current $i_{14}$ of the preceding phase (shown in a dot dash line in Figure 2b) reaches zero and thus, the rise of the current $i_{12}$ is prevented by the inductance of the load 21. This increase of current in one phase while the current in the other phase is decreasing is described as "commutation."

The current in phase 12 now is substantially constant except for a sharp rise occurring at the time $t_5$ which is nothing but the equivalent of the negative current flowing through phase 14 as will hereinafter be explained for phase 12.

At the time $t_9$, the contact 19 of phase 13 closes giving start to a make step lasting until $t_{10}$ and, furthermore, a quick rise of current between $t_{10}$ and $t_{11}$ of the current $i_{13}$ shown as a dotted line. The current $i_{12}$ of phase 12 is, therefore, forced to decrease to zero and reaches zero at the time $t_{11}$. With an ideal commutating reactor material, the current $i_{12}$ would stay at zero henceforth until the commutating reactor has its flux reversed.

The change of the flux $F_{24}$ is shown in Figure 2c occurring between the time $t_{11}$ and $t_{13}$. Since the commutating reactor iron is not ideal, a substantial negative current must flow through phase 12, this current being the magnetizing current of the commutating reactor. It is this current which must be interrupted by the contact 18 if the device is to function as a rectifier.

This negative current shown as $i_{12}$ in Figure 2b between $t_{11}$ and $t_{13}$, although it is about .001 of the peak current (grossly exaggerated in Figure 2b), is very detrimental to the contact 18 and should be prevented. It is the purpose of the break pre-excitation to prevent this negative current.

After the contact 18 opens, the current through phase 12 remains zero until the contact closes again. It would be desirable, however, before the contact closes again at the time $t_1$, to introduce a short positive current pulse occurring prior to the time $t_0$, for example, at the time $t_{21}$ and lasting until the time $t_{22}$, as shown in Figure 2b. This short current pulse would provide partial flux reversal of the core 24 as shown by the shape of $F_{24}$ in Figure 2c. This partial flux reversal prevents the actual make step from being too long, that is, lowering the output voltage of the rectifier unduly. A short current pulse as shown between $t_{21}$ and $t_{22}$ in Figure 2b would be very desirable but it is not possible. The Figure 2b, therefore, is only an idealized figure.

Figure 2D:
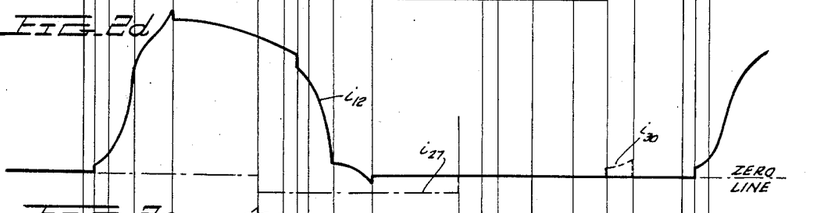
Figure 2d is a current-time representation similar to Figure 2b but shows the addition of break pre-excitation current $i_{27}$ and flux reversal current $i_{30}$.

The real shape of the phase current $i_{12}$ in the phase 12 of the rectifier is shown in Figure 2d. This figure is different from Figure 2b inasmuch as the negative current between the time $t_{11}$ and $t_{13}$ has been changed into a substantially positive current, and the current pulse required from the time $t_{21}$ to $t_{22}$ has been eliminated. It is accomplished by adding the current $i_{27}$ through the break pre-excitation winding 27, and the current $i_{30}$ through the flux reversal winding 30.

The break pre-excitation current $i_{27}$ starts at the time $t_7$ and stops at the time $t_{16}$. From the time $t_{16}$ to the time $t_7$ of the next cycle, this current must be zero, whereas from the time $t_7$ to the time $t_{16}$, it must be constant and of the magnitude shown in Figure 2d. It will be subsequently described how such a current can be produced in the winding 27.

It appears from Figure 2d that the current to be interrupted by the contact 18 is now slightly positive and smaller than it was in Figure 2b. Experience with mechanical rectifiers shows that it is much safer to interrupt positive current than to interrupt negative current because if an arc persists after the interruption the current has a tendency to become negative. If it is positive and an arc is drawn, the current in the arc has to reverse. If the current is small and positive and an arc is drawn, a small positive current must go through zero. The ionization provided by a small positive current is not sufficient to provide re-ionization after the current has reversed, that is, the arc is extinguished and no reverse current will flow. This means that the mechanical rectifier works properly and no backfires can occur.

If the current is negative, as shown in Figure 2b, if an arc is drawn, it is drawn with a negative current of small magnitude which is ever increasing. If an arc exists, the current through the arc will ever increase in the negative direction and there is no means to quench this arc. The mechanical rectifier then backfires and ceases to operate.

Figure 2E:
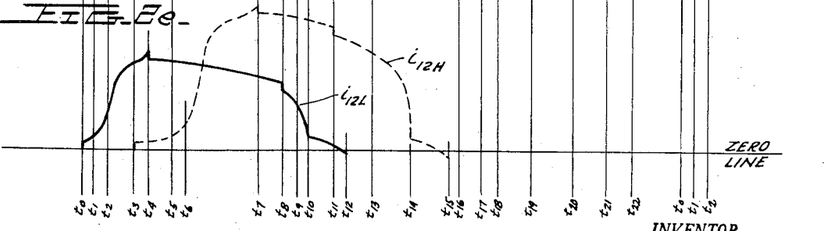
Figure 2e is a current-time representation similar to Figure 2d showing the current for low overlap $i_{122}$ and high overlap $i_{124}$.

Figure 2e finally shows why the break pre-excitation current ($i_{27}$ in Figure 2d) has to last for a certain time, for example, from the time $t_7$ to the time $t_{16}$. This time interval is required to provide break pre-excitation for the earliest break step, exemplified by the current $i_{12L}$ and the latest break step exemplified by the current $i_{12H}$. The latter current is shown dotted, its make is delayed until $t_3$ and by a long make step lasting from $t_3$ until the time $t_6$. Practically, the duration of the pre-excitation current $i_{27}$ is chosen not only to cover the full range needed, but also to obtain an easy manufacture of the components of the pre-excitation circuit which will be described in the following.

II. Practical solution of the problem—break pre-excitation circuit with transductors I have described in the foregoing description of Figure 1 and Figure 2 that a break pre-excitation current of the commutating reactors is desirable, lasting for only a relatively short interval, for example, from time $t_7$ until time $t_{16}$ in Figure 2, and constant during this interval. Outside of the interval, the current through the pre-excitation winding should be zero.

It is important to note that the simple use of a direct current which is switched from one commutating reactor to another by means of a contacting device is not practical. The pre-excitation current must remain constant, or of a certain pre-determined shape, during the whole length of the break step. However, the pre-excitation winding is subjected to the voltage induced in the commutating reactor core (24 for example). This voltage, of course, will tend to change the amount of the pre-excitation current which means that this direct current circuit would require a very large inductance. A direct current flowing in a circuit with such a large inductance cannot be switched without appreciable arcing on the switching contacts. It is preferable, therefore, to provide a magnetic means of switching without contacts which assures a correct operation even for many years.

Figure 3:
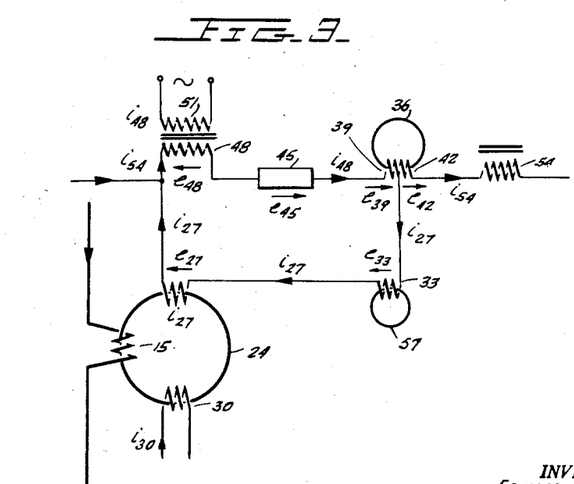
Figure 3 is a circuit diagram illustrating a pre-excitation circuit for a single phase of a mechanical rectifier.

The circuit herein described is shown for one phase, for example, the phase twelve in Figure 1 by the circuit on Figure 3. This circuit consists of the previously described commutating reactor coil 15, the core 24, break pre-excitation winding 27 and flux reversal winding 30. In addition to this, the circuit now contains a single-phase transformer with a primary winding 51 and a secondary winding 48. A resistor 45, a two-winding saturable reactor 36 with the windings 39 and 42 and a single winding saturable reactor with a core 57 and a winding 33. This closed circuit is supplied from the outside by a direct current $i_{54}$ which is held constant by a large choke 54.

A saturable reactor or transductor is a toroidal coil with an iron core which is easily saturable, the core material preferably having a square hysteresis loop, the same as described in my previous application (C-186) Serial No. 212,017, filed February 21, 1951, for commutating reactors. The difference between a commutating reactor and a transductor can be described as follows:

1. *Commutating reactor.*—High current, high voltage coil with easily saturable core. Cross section of the iron core only sufficient to withstand the full voltage during a short time of the cycle (called step length, 16 to 20 degrees electric). Magnetizing current one thousandth of rated current, inductive voltage drop approximately 3% of rated voltage. Used in main current circuit.

2. *Transductor.*—Low current, high voltage coil with easily saturable core. Cross section of the iron core large enough to withstand the full voltage of one half cycle (or more). Magnetizing current one percent of rated current, inductive voltage approximately 5% of rated voltage. Used in control circuits.

The operation of the circuit shown in Figure 3 is determined by the alternating voltage provided by the transformer 51—48. Superimposed to the alternating current produced by this voltage, there is a direct current. We have, therefore, a circuit with a mixed A.-C. and D.-C. operation. As it was shown in Figure 2d, the current in the pre-excitation winding 27 should be a unidirectional pulse lasting for a short time and for the rest of the cycle substantially equal to zero and maintained at zero even though there is a substantial voltage induced into the winding 27 by the change of flux in the commutating reactor core 24, as shown in Figure 2c, in the time intervals $t_1$ to $t_2$ and $t_{21}$ to $t_{22}$.

The major problem of the pre-excitation circuit, solved by the circuit Figure 3, consists of maintaining a constant current for a certain length of time, although the induced voltage in the circuit varies during that time and holding the current at zero value for another (longer) time, although there is a substantial voltage induced in the circuit.

Figures 4A, 4B:
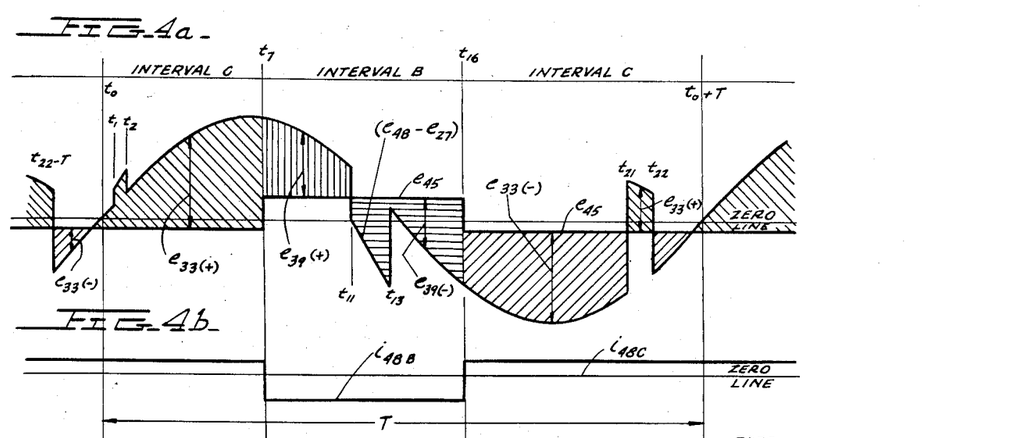
Figure 4a shows the voltage appearing in the break pre-excitation circuit of Figure 3.
Figure 4b shows the A.-C. current appearing on the secondary winding 48 of the transformer supplying the pre-excitation circuit.
Figure 4C:
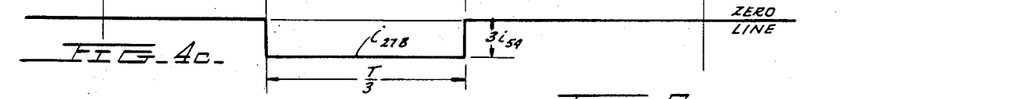
Figure 4c shows the unidirectional pulse current provided by the pre-excitation circuit to the pre-excitation winding $i_{27}$.

The operation of the circuit shown in Figure 3 is explained in Figure 4. Figure 4a shows the voltages appearing in the break pre-excitation circuit of Figure 3. Figure 4b shows the A.-C. current provided by the secondary 48 of the transformer supplying the pre-excitation circuit. Figure 4c shows the unidirection pulse current provided by this pre-excitation circuit in the pre-excitation winding $i_{27}$. Below are the equations which determine the operation of the circuit shown in Figure 3.

A—GENERAL EQUATIONS (1) $$e_{48} - e_{27} = e_{33} + e_{39} + e_{45}$$

(2) $$i_{27} + i_{54} = i_{48}$$

(3) $$\int_0^- e_{48}dt - \int_0^- e_{27}dt = \int_0^- e_{33}dt + \int_0^- e_{39}dt + \int_0^- e_{45}dt$$

(4) $$e_x = \frac{Nd\phi x}{dt}$$

(5) $$\int_0^- e_x dt = -N(\phi_{xt} - \phi_{xo}) = 0$$

(6) $$0 - 0 = 0 + 0 + \int_0^- e_{45}dt, \int_0^- e_{45}dt = 0$$

(7) $$e_{45} = -i_{48}R_{45}$$

(8) $$\int_0^- i_{48}dt = 0$$

INTERVAL B (9) $$e_{33} = 0 i_{48_B} N_{39} + i_{54} N_{42} = 0$$

(10) $$i_{48_B} = -i_{54}\frac{N_{42}}{N_{39}} i_{27_B} = i_{48_B} - i_{54}\left(\frac{N_{42}}{N_{39}} + 1\right)$$

(11) $$\text{For } \frac{N_{42}}{N_{39}} = 2 i_{27_B} = -3 i_{54}$$

INTERVAL C (12) $$e_{39} = e_{42} = 0 i_{27_C} = 0$$

(13) $$i_{48_C} = i_{54}$$

(14) $$\int_0^- i_{48}dt = 0 = i_{48_B}(t_{16} - t_7) + i_{48_C}(T + t_7 - t_{16}) = -i_{54}$$

$$\frac{N_{42}}{N_{39}}(t_{16} - t_7) + i_{54}(T + t_7 - t_{16}) = 0$$

(15) $$\frac{t_{16} - t_7}{T} = \frac{N_{39}}{N_{39} + N_{42}} \text{ For } \frac{N_{4i}}{N_{39}} = 2 t_{16} - t_7 = \frac{T}{3}$$

(16) $$i + i_T + i_{LC} + i_{RC} = i_M$$

(17) $$i = (i_M - i_T) - (i_{LC} + i_{RC})$$

Voltages induced in the circuit Figure 3 from the outside are the transformer voltage $e_{48}$ and the commutating reactor induced voltage $e_{27}$. These voltages subtract each other in their effect in the closed loop of the circuit Figure 3. The combined effect of both voltages is shown by the wave line $e_{48}$ minus $e_{27}$ in Figure 4a. This wave line consists mostly of the sine wave of the A.-C. voltage $e_{48}$ with the additional step voltages induced in the commutating reactor winding 27 occurring whenever the flux $F_{24}$ shown in Figure 2c changes, that is, in the time intervals $t_1$ to $t_2$ and $t_{11}$ to $t_{13}$ and $t_{21}$ to $t_{22}$. During these times, the rapid change of flux in the commutating reactor causes a high induced voltage in the circuit which is shown as sudden changes of voltages in Figure 4a. Equation 1, shown under A above, indicates that the sum of all induced voltages from the outside is equal to all counter E. M. F. inside the circuit.

For the following explanation, it was assumed that the components 27, 33, 29 and 48, that is, all the coils in the circuit which are wound around iron cores, satisfy the following condition.

(1) The resistance of each coil should be negligible, which means practically that the resistive voltage drop should be less than 1% of the actual voltage appearing on the coil.

(2) The leakage reactance or air inductance should also be negligible which means practically that the inductive voltage drop should be less than 1% of the induced voltage appearing across the coil.

(3) For the components 39 and 33 only, which are wound around the cores 36 and 57, the magnetizing current of these cores shall be less than 1% of the rated current flowing through the coils.

Practical transductors, transformers and commutating reactors have been built in this manner as to satisfy these three conditions or even better. With such components, the circuit actually behaves the way it is described below which means that the figures shown in Figure 4 are practical figures although, from their square appearance, we might conclude that these figures are only theoretically possible.

Returning to the general equations above under A, Equation 2 means that the sum of the current in a node is zero. Equation 3 is the voltage time integral of Equation 1 over one full cycle. This equation, going over one full cycle, is true no matter where the starting time is chosen. Equations 4 and 5 are true for all the voltages $e_{48}$, $e_{27}$, $e_{33}$ and $e_{39}$. These voltages have in common that they are induced voltages, that is, voltages due to the change of flux in a core and not voltages of resistive or capacitive origin. Such voltages are determined by the Equation 4 which means that an induced voltage is proportional to the number of turns and the rate of change of flux through the coil (respective to time). Integrating Equation 4 we obtain Equation 5 which states that the integral of an induced voltage over one full cycle is equal to the flux change over that full cycle.

Since, in a steady state, the change of flux during one full cycle must be zero, because the flux cannot continuously increase or decrease, it means that the time integral over one full cycle of induced voltage is always equal to zero. Substituting (5) into Equation 3, we obtain the next equation which simplifies itself into Equation 6. Equation 6 states that the voltage-time integral of the voltage across the resistor 45 over one whole cycle equals zero, or, in other words, that the voltage across resistor 45 must be a true A.-C. voltage and thus the current through resistor 45 a true A.-C. current. This means also that the full amount of direct current $i_{54}$ must flow through the coils 27 and 33.

From these equations follows first of all that the voltage time areas covered by the voltages of all and any components shown in the circuit figure (3) are zero for a full cycle, that is, also that the D.-C. voltage drop of the circuit is nil. Practically, there is a small D.-C. voltage drop but it is very small compared to the actual voltages handled by the circuit components. This means also that the D.-C. power lost in this pre-excitation circuit is very small.

Equations 7 and 8 show the relationship between the voltage $e_{45}$ and the current $i_{48}$ through the resistor 45 and that the D.-C. component of the current $i_{48}$ equals zero.

We have established above that the current $i_{27}$ through the components 27 and 33 is in the average a direct current and equal to the current $i_{54}$ except that it is in the opposite direction to the arrow shown in the figure which means that it is a negative current with respect to the main current $i_{12}$ in the commutating reactor winding 15. If this direct current $i_{54}$ would flow directly from the winding 27 through the winding 33 and out through the choke 54, we would have a D.-C. preexcitation of the coil 27. However, since a substantial A.-C. voltage $e_{48}$ is induced by the winding 48, a current $i_{27}$ wants to flow in the direction of the arrow shown, whenever $e_{48}$ is negative. Reversal of this current, however, is prevented by the transductor 33 with the core 57. Such a coil has two modes of operation as will hereinafter be more fully described.

One, when it is saturated, it lets the current pass freely without offering an appreciable impedance. The other mode of operation occurs when the core is not saturated then it results in an almost infinite impedance to the passage of current and will, therefore, maintain the current practically at zero value. When the current $i_{27}$ wants to flow in the direction shown by the arrow, it is prevented from doing so by the coil 33 with the core 57. The only current flowing will be a very small magnetizing current which practically will be less than 1% of the desired pre-excitation current. The core 57 of this transductor is made large enough to handle the full voltage supplied by the transformer winding 48 without this core ever saturating in the negative direction, that is, the rise of the current $i_{27}$ in the direction shown by the arrow is not possible. The range during which the rise of the current $i_{27}$ is prevented is shown as interval C in Figure 4.

When the voltage $e_{48}$ is positive, that is, a current $i_{27}$ wants to flow in the opposite direction of the arrow, the core 57 saturates after a certain time and the current $i_{27}$ can rise freely until the core 36 unsaturates. Core 36 now becomes the core of an almost ideal transformer maintaining the sum of the ampere turns of the windings 39 and 42 at almost zero providing an effective limitation of the current $i_{27}$ and the current $i_{48}$. This occurrence is shown in interval B in Figure 4.

The behavior of the pre-excitation current $i_{27}$ during the interval B within which break pre-excitation is required is shown in Figure 4 and explained by means of the Equations 9, 10 and 11. The voltage Equation 1 is modified by the fact that the transductor voltage on transductor coil 33 is zero which accounts for the shape of the voltages in Figure 4a. The wave line during the interval B is the sum of the impressed voltages, that is, $e_{48}$ minus $e_{27}$. The square wave is $e_{45}$, the voltage across the resistor which is proportional to the current through the resistor. The difference between these is the voltage $e_{39}$, the voltage across the transductor coil 39. This voltage is partly positive, partly negative, during the interval B, the vertically shaded area being positive, the horizontally shaded area being negative, these two areas being equal and of opposite sine, this in order to satisfy the condition that the total flux change is zero as shown in Equation 5.

In interval B, the currents have to satisfy Equation 9 which is the equation of an ideal transformer. We have stated above that the transductor with the core 36 must have a negligibly small magnetizing current and that this can be practically accomplished. If, therefore, the core 36 is not saturated, that is, during interval B, the Equation 9 is valid, $i_{48B}$ is the current in winding 39 and $i_{54}$ the current in winding 42. $N_{39}$ and $N_{42}$ are the number of turns in these windings. From Equation 9 follows Equation 10. Substituting (10) in Equation 2, we obtain Equation 11 for the pre-excitation current during the interval B, that is, $i_{27B}$. This current is negative, that is, in opposition to the current shown by the arrow in Figure 3, its magnitude depending only upon the bias direct current $i_{54}$ and the ratio of number of turns in the transductor with the core 36.

The result of Equation 11 is very important. It means that the pre-excitation current through the pre-excitation winding 27 is a current proportional to the direct current which biases the transductor circuit. The factor of proportionality is a factor depending only on number of turns, that is, a pure, rigid number. If, therefore, the current $i_{54}$ is held constant by means of a large choke, the pre-excitation current $i_{27}$ is also constant during the interval B. If the ratio of the number of turns of the windings 42 and 39 is equal to 2, the pre-excitation current $i_{27B}$ is equal to three times the D.-C. bias current, but in opposite direction to the arrow shown.

During this interval C, the voltage across the transductor with the core 36 is zero because this core now is saturated. Therefore, the voltage $e_{39}$ and the voltage $e_{42}$ equal zero. On the other hand, the transductor core 57 is unsaturated and, therefore, the coil 33 has an infinitely high inductance and cannot pass any current except its negligibly small magnetizing current. Therefore, we have in Equation 2 that $i_{27C}$ equals zero, the desired property of the circuit which is to keep the pre-excitation current equal to zero, during the most part of the cycle, that is, when we don't need pre-excitation. The only current passing being the small constant magnetizing current of the core 57 which indeed can be held at a very small magnitude. The current equation for this part of the cycle now becomes Equation 13 which means that the current through the resistor and the transformer is now equal to the D.-C. current $i_{54}$.

Figure 4a shows, during the interval C, that the difference between the total induced voltage $e_{48}-e_{27}$ and the resistor voltage $e_{45}$ is the transductor voltage $e_{33}$; this follows from Equation 1 because $e_{33}$ is zero. The right hand shaded areas are for $e_{33}$ negative and the left hand shaded areas for $e_{33}$ positive. These two areas are equal and of opposite sine to satisfy the Equation 5.

In Figure 4b, we can now see the A. C. current delivered by the coil 48 which is a current presenting a long low positive constant part and a short high negative constant part. The positive current is equal to the D. C. bias and the negative current is given by Equation 11.

Figure 4c shows the pre-excitation current in the pre-excitation windings 27. It is a current which is zero during most part of the cycle and negative and constant during the interval B when we need break pre-excitation. The ratio of the times of this unbalanced current wave is shown in the bottom of Figure 4. Equation 14 is the application of Equation 8 to the currents determined by Equations 10 and 13.

First of all, it is apparent that the D. C. current $i_{54}$ drops out of Equation 14 which leads to Equation 15, meaning that the ratio of the time during which the pre-excitation current is on to the total time of the cycle is equal to a pure ratio of number of turns, that is, numerical constant.

It is important to note that all of these relationships are physically correct and no simplifying assumptions were made. This time ratio is thus independent of the current furnished by the D. C. bias and also independent of the voltage $e_{48}$ furnished by the supply transformer. For the example chosen for interval B, that is $$\frac{N_{42}}{N_{49}} \text{ equal to } 2$$

we have a pre-excitation interval equal to one third of the cycle. By freely choosing the ratio of number of turns, or even making it adjustable, any duration of pre-excitation interval can be chosen.

The location of the pre-excitation current with respect to the voltage of the rectifier as shown in Figure 2d can be chosen freely by varying the relative position of the pre-excitation voltage $e_{48}$ in its phase angle with respect to the three main voltages of the rectifier. This is shown later on a practical example.

III. Complete rectifier circuit

Figure 5:
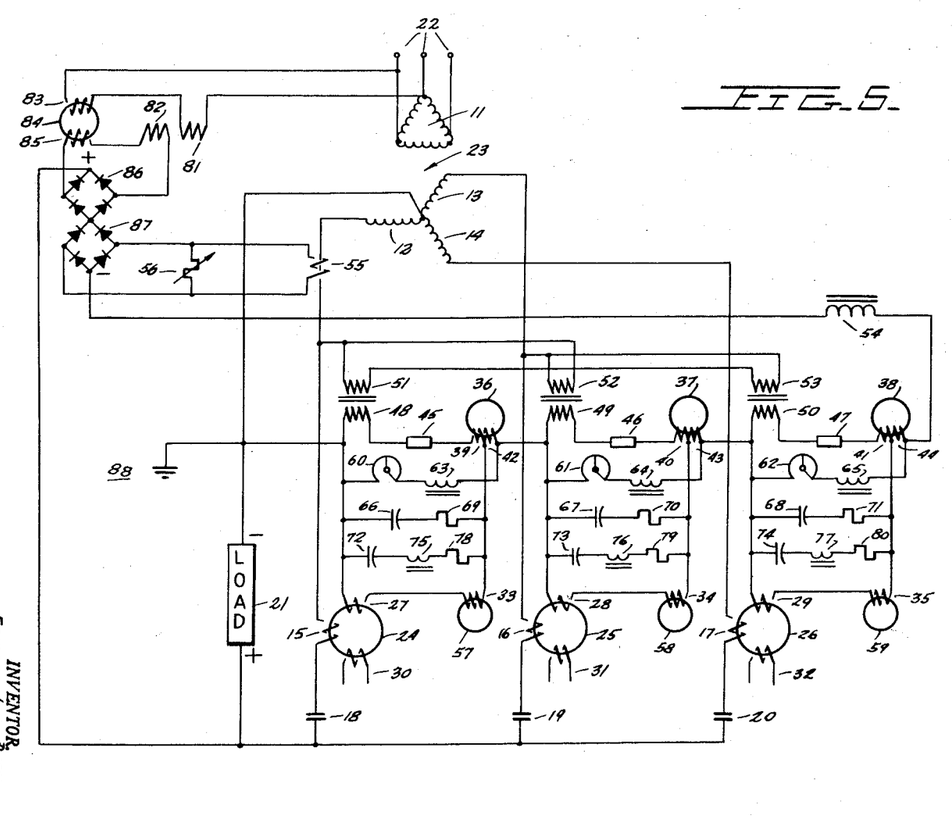
Figure 5 shows the pre-excitation circuit in a three phase system and also includes the straightener circuit, an adjustable D.-C. bias and a D.-C. source for the transductor.

Inserting the transductor pre-excitation circuit shown on Figure 3 in the rectifier circuit shown in Figure 1 gives a more complete circuit shown in Figure 5. This circuit has been completed not only with the transductor pre-excitation circuit but also with straightener circuits, an adjustable D. C. bias and a D. C. source for the transductor.

The components shown in Figure 1 are unchanged and their numbers are the same. The components of Figure 3 are also unchanged and the numbers are the same with the exception that the phases 13 and 14 are provided with the next higher number of the component shown in phase 12, for example, the transductor winding 33 in phase 12 becomes 34 in phase 13, and 35 in phase 14 and so on for all other components.

For the transformers with the primary winding 51, 52 and 53, their A. C. supply is taken directly from the secondary voltage of the rectifier with a phasing corresponding to the relative position of the phase voltages in Figures 4 and 2 under the assumption that the times $t_0$, $t_7$ and $t_{16}$ are the same. This transformer connection has the advantage of simplicity. It should be noted that, because the transformer 51/48, 52/49, 53/50 are isolating transformers and the windings 27, 28 and 29 are isolated from the cores 24, 25 and 26, the complete pre-excitation circuit is isolated from the main circuit and can be held at a ground potential or another low potential which renders the operation of the pre-excitation circuit safer. The grounding of the circuit is shown by 88.

Since the three single transductor circuits, one required for each phase, are needed to compensate for the magnetizing currents of cores 24, 25 and 26, their respective currents shown as $i_{27}$ in Figure 4 might be of different magnitude. It has been proved before that this pre-excitation current is directly proportional by a fixed proportion, to the D. C. current $i_{54}$ flowing through the transductor D. C. supply. If, therefore, a large D. C. supply current is provided, that is, larger than needed, and part of it is bypassed around the transductor, then only the part which goes through the transductor will provide for the pre-excitation.

Such adjustable bypass circuits are shown by the components 60, 63 in phase 12; 61, 64 in phase 13 and 62, 65 in phase 14. These bypass circuits consist of a rheostat 60, 61 or 62 which can be adjusted to take any desired amount of bypass current. The chokes 63, 64, 65 prevent the A. C. voltage to produce a pronounced A. C. current in these bypass circuits which would impair the operation of the transductor. The same is true for the large choke 54 which prevents an A. C. current to flow in the D. C. supply of the transductors. Practically, it is possible to design these four chokes large enough to prevent any appreciable A. C. ripple to flow while keeping the chokes at an economical size.

In addition to the transductors described previously, straightener circuits have now been added. These straightener circuits operate the same way as in my previous application Serial No. 212,017, filed February 21, 1951.

It should be noted, however, that during the interval C, when there is no break pre-excitation current flowing, this current is prevented to flow by the transductor coils 33, 34 and 35 which are held at zero current by the small magnetizing current of the cores 57, 58 and 59. The effective blocking of these transductors also applies to the straightener circuit currents which are inoperative during the interval C and will prevent an influence of straighteners upon the flux reversal circuits shown by the coils 30, 31 and 32, or the make pre-excitation which is not shown in Figure 5.

During the interval B, the tranductor cores 57, 58 and 59 are saturated and the coils 33, 34 and 35 have practically zero impedance. The straightener circuits, therefore, are directly connected across the pre-excitation windings 27, 28 and 29, thus having the same connection as previously described in my application Serial No. 212,017, filed February 21, 1951.

During the interval B where break pre-excitation and straightener action is needed, the straightened circuits are connected as described before and will, therefore, operate the same way. With this connection, it is possible to have straightener action when it is needed, and to have no straightener action when it is not needed. The dimensioning and operation of the straightener is the same.

Figure 6A:
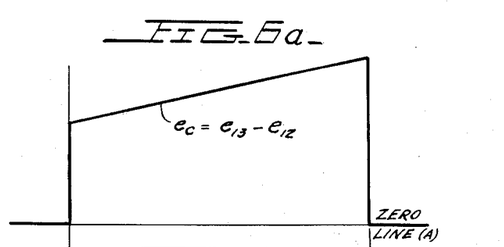
Figure 6a illustrates the commutating voltage $e_c$.

The straightener action will hereinafter be described. The magnetizing currents of the commutating reactor cores 24, 25, 26 are variable during the step which appears from the shape of current $i_{12}$ in the interval $t_{11}$ to $t_{13}$ in Figure 6c. This same shape is repeated in Figure 6b as the magnetizing current $i_M$. For reference, the commutating voltage $e_c$ is shown in Figure 6a (note that the time scale has been expanded). The transductor current $i_T$, which is constant during the break step, is also shown in Figure 6b.

Figure 6D:
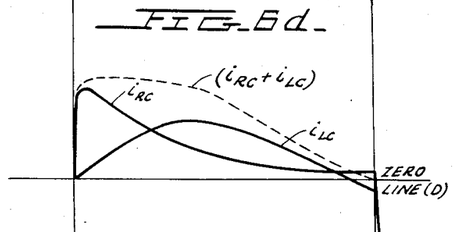
Figure 6d illustrates the current flow $i_{RC}$ through the capacitor 66 and resistor 69.
Figure 7:
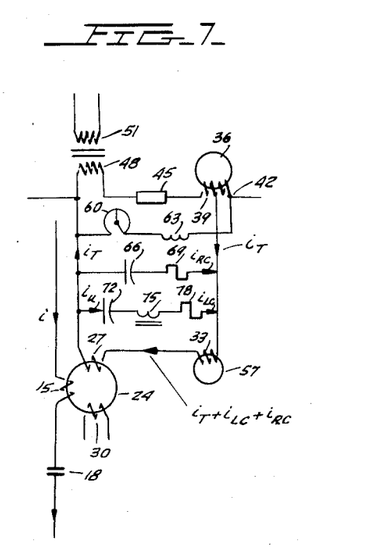
Figure 7 is a diagrammatic view of the circuit connections of Figure 5 illustrating current flow at any one instant.

Figure 7 is a diagram of the circuit connection with the currents drawn in as arrows. Positive currents flow in the direction of the arrows, negative currents flow opposite. The current flowing through the circuit consisting of the capacitor 72, the inductor 75 and the resistor 78 is called $i_{LC}$ and shown in Figure 6d. The current flowing through the circuit consisting of the capacitor 66 and the resistor 69 is called $i_{RC}$ and also shown in Figure 6d.

Assuming that the windings 15 and 27 have the same number of turns, we can write the Equation 16 which states that the sum of currents around an iron core is equal to its magnetizing currents. The current $i$ is the one flowing in the main contact 18 of the rectifier, it should be as small as possible, and positive at the end of the step (as explained previously). The Equation 16 is rewritten as (17) in which the first parenthesis appears on Figure 6c and the second parenthesis on Figure 6d as a dotted line. Making the difference between these values gives the main current $i$ according to Equation 17 and shown on Figure 6e.

Figure 6B:
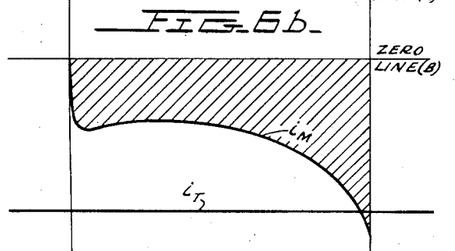
Figure 6b illustrates the magnetizing current $i_m$ (no pre-excitation, negative current) and the constant pre-excitation current.
Figure 6C:
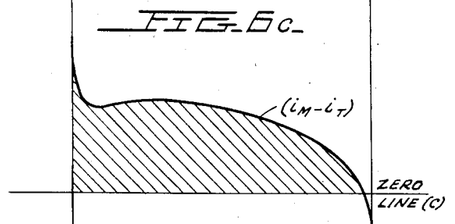
Figure 6c illustrates the difference between current $i$ and $i_T$. (Constant pre-excitation positive current.)
Figure 6E:
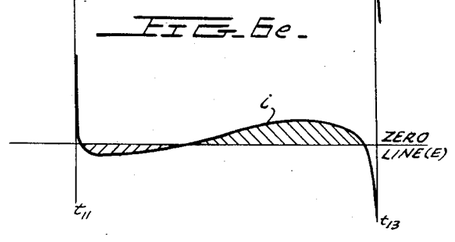
Figure 6e illustrates the net current in the circuit (pre-excitation plus straighteners).

Comparing the Figures 6b (no pre-excitation, negative current), 6c (constant pre-excitation, positive current) and 6e (pre-excitation plus straighteners) shows the great improvement gained with this method.

Finally, for the transductor D.-C. circuit, a direct current supply is needed. This direct current can be a constant D.-C. of unchanging magnitude which would be rather unsatisfactory since the amount of pre-excitation current required changes with the kind of operation of the rectifier. This was also described in my previous application Serial No. 212,017, filed February 21, 1951, on pre-excitation. The same reasons apply also to this circuit.

The pre-excitation current of a commutating reactor increases with increasing speed of magnetization of the iron core of the commutating reactor. The speed of magnetization itself increases when the voltage across the reactor increases. A good approximation of this behavior is to assume that the pre-excitation current is a constant current plus a current proportional to the voltage across the commutating reactor.

A constant amount of pre-excitation current is provided by a constant voltage transformer consisting of the winding 83, the saturable core 84, and the winding 85 producing a voltage which is rectified in the rectifier 86. This is a constant direct voltage generator which I have described in my previous application Serial No. 312,053, filed September 29, 1952, now abandoned.

An additional variable voltage, increasing with the primary voltage, must be added. This is provided by the air core transformer with the primary 81 and the secondary 82. By selecting the correct number of turns of this transformer, a partial addition of the variable voltage can be obtained which is also rectified in the same rectifier 86. A correct compensation of the variation of the magnetizing current with the variable voltage can be selected experimentally by making the number of turns 81, 82, 83 and 85, or any one of them, adjustable. It is then easily possible to adjust the pre-excitation by supplying a variable voltage on the transformer 22 and adjusting these number of turns in such a way as to obtain an optimum pre-excitation during the total variation of voltage.

There is another influence on the voltage applied to the commutating reactor which comes from the effect of the increasing load current which increases the overlap of the rectifier shown by the time $t_9$ to $t_{11}$ in Figure 2b. This overlap time delays the point at which the break step occurs which is equivalent to an increase in the commutating voltage. This again reflects itself in a small increase of magnetizing current which should be compensated by an increasing pre-excitation current. This is accomplished by means of the current transformer 55 with a shunt 56. The voltage across the shunt 56 is rectified in the rectifier 87 and its voltage is added to the voltage of the rectifier 86 giving a combined voltage of the D.-C. pre-excitation. If the load of the rectifier increases, the current in the current transformer 55 increases, increasing the voltage across the shunt 56 and thus increasing the current in the D.-C. pre-excitation circuit. By making the shunt 56 adjustable, it is also possible to adjust experimentally this increase of the pre-excitation in order to obtain a perfect matching.

The rectifier can be equipped with voltage control by means of magnetic flux reversal effected with windings 30, 31 and 32. This voltage control will delay the rise of the current obtained by varying the length of the make step shown by $t_1$ to $t_2$ in Figures 2b and 2d. As for the influence of the overlap by the increased current, this voltage control by increasing the make step will also increase the voltage across the commutating reactor necessitating an increase of the pre-excitation current. Since this voltage control decreases the voltage across the load 21, this can be taken care of by connecting the direct voltage produced by the main rectifier in opposition to the direct voltage produced by the rectifiers 86 and 87. This is shown by the plus and minus signs in Figure 5, progressing from minus to plus in the rectifiers 86 and 87, and then from plus to minus again progressing in the same direction in the load 21. If the voltage of the rectifier is regulated down, the voltage across the load 21 increases which is causing an increase in the difference voltage between the sum of 86 and 87 minus the voltage of 21. The total of the pre-excitation circuit, therefore, increases, which causes also an increase in the pre-excitation current.

It is necessary to adjust these pre-excitation voltages experimentally which can be done by providing the components 56, 81, 82, 83 and 85 with adjustable taps. Instead of the D.-C. voltage shown by the load 21, it can also be provided with a bypassing potentiometer in such a way that only a small part of this voltage is inserted in the D.-C. pre-excitation circuit. All these components can be made rather small since the pre-excitation current required for the commutating reactors usually is approximately .001 of the load current of the mechanical rectifier and the D.-C. voltage needed for the pre-excitation is usually less than 10% of the output voltage which means that the power required for the pre-excitation circuit as shown in Figure 5 usually is about .0001 of the power output of the rectifier. The components, therefore, are very small and thus are not expensive and do not waste much power.

IV. Oscillographs of pre-excitation for mechanical rectifier

A mechanical rectifier operating under full voltage was analyzed with a dual beam cathode ray oscilloscope. Photographic pictures were taken of the voltages appearing on the screen.

Figure 8:
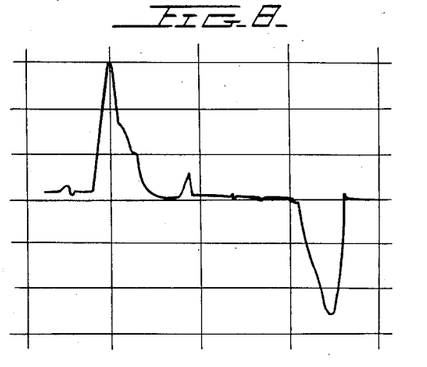
Figure 8 shows the voltage across one commutating reactor taken over a full cycle.

Figure 8 shows the voltage across one commutating reactor taken over one full cycle, progressing from left to right. At the left hand side we see first the flux reversal voltage which is described in my application for a flux reversal circuit Serial No. 423,358 filed April 15, 1954. The next small voltage pulse is the voltage appearing on the commutating reactor during the make step. This small pulse is equivalent to the voltage appearing between the times $t_1$ and $t_2$ in Figure 4a. Between the make step and the break step the contact carries the full current. The next large negative pulse is the break step. It corresponds to the voltage appearing in Figure 4a in the time interval $t_{11}$ to $t_{13}$. The contact opens at the moment where there is a small interval in the curve.

Figure 9:
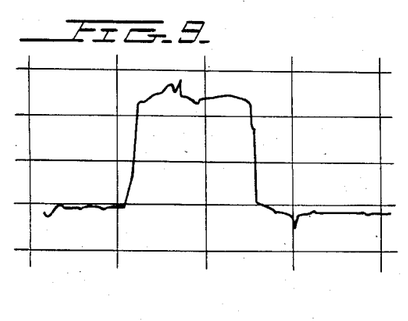
Figure 9 shows the current through the contacts of the mechanical rectifier.

Figure 9 shows the current through the contact of this mechanical rectifier. At the left hand side of the figure the contact is open and no current flows. When the current starts to rise, the contact is closed but limited in its rise by the make step which lets the current rise only slowly. At the end of the make step the current rises quickly to its maximum value, remains there until the end of the current carrying period, then decreases almost to zero to the break step. The break step current is very small and therefore the actual current interrupted can only be seen as a very small changing current, two squares after the beginning of the break step and two squares before the end of the break step. The end of the break step is shown as a small negative pulse of the current wave. Figure 9 corresponds to the current wave shape shown in Figure 2d. The difference in the shape is largely due to the picture being taken in a rectifier having a three phase double way connection, whereas the drawing of Figure 2 was made for a three phase single way connected rectifier. The principle of operation, however, is the same.

Figure 10:
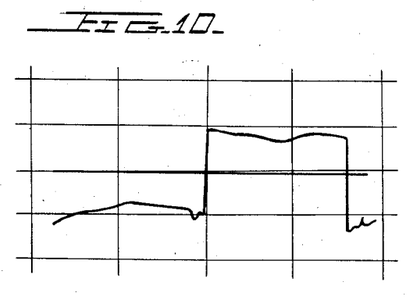
Figure 10 shows the current flowing in the saturable reactor pre-excitation circuit.

Figure 10 shows the A.-C. current flowing to the transductor pre-excitation circuit, the same as in Figure 4b. As this current is only small, the voltage it produces across a shunt is small and therefore the wave shape shown in the oscilloscope is distorted. The oscilloscopic picture, however, shows that the current is a true alternating current with short rises and sharp decreases and remaining approximately constant when it has reached its full value.

Figure 11:
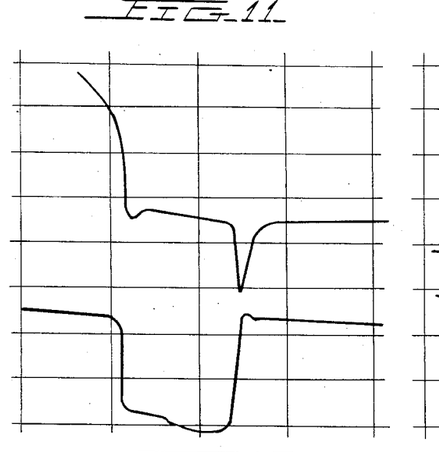
Figures 11 and 12 show the current through the contacts of the mechanical rectifier and the voltage across the commutating reactor of a mechanical rectifier during the break step only.
Figure 12:
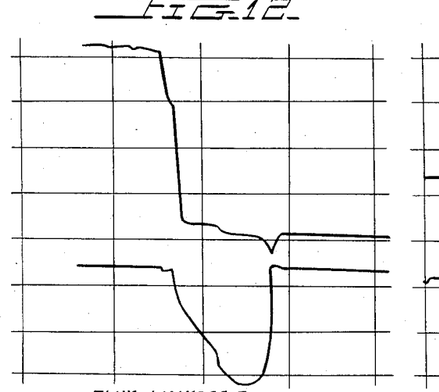

Figure 11 and Figure 12 show the current through the contact of the mechanical rectifier and the voltage across the commutating reactor of the mechanical rectifier during the break step only. The upper trace in Figure 11 shows the current through the contact of the mechanical rectifier in the interval of the break step and in the lower trace the voltage across the commutating reactor during the break step. When the voltage in the lower trace suddenly decreases to a large negative value, the break step starts and when the voltage returns to zero, the break step ends. Due to the break pre-excitation circuit, described in this disclosure, the current through the break step is almost zero and the break of the contact occurring in the center of the break step can be seen only as a small wiggle of the curve.

Figure 11 was taken on a rectifier operating at very low voltage, obtained with the magnetic voltage control of the rectifier.

Figure 12 shows the same pictures taken on the same rectifier operating on its highest voltage obtainable with magnetic control. It shows that the break pre-excitation circuit is just as effective at the highest voltage as at the lowest voltage. The breaking point of the contact again is approximately in the center of the step, and the current actually interrupted is shown only as a slight change in the current in the upper trace.

Figure 13:
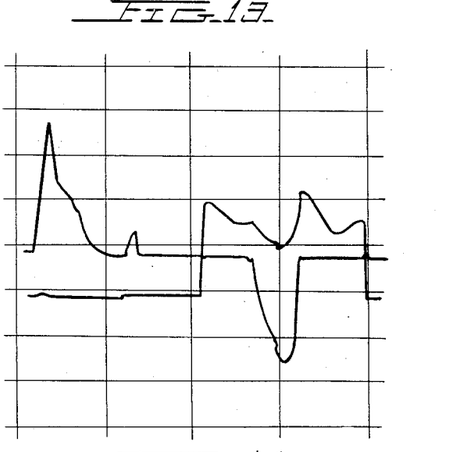
Figures 13 and 14 show the voltage across the commutating reactor.
Figure 14:
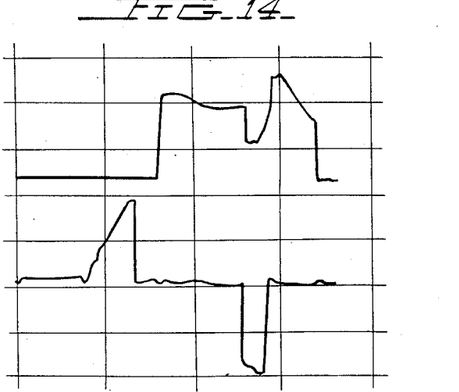

Figure 13 and Figure 14 show the voltage across the commutating reactor in the upper trace of Figure 13 and the lower trace of Figure 14 and the break pre-excitation plus straightener current in the lower trace of Figure 13 and the upper trace of Figure 14. At the left hand side of both figures we see flux reversal and the make voltage pulse. In the commutating reactor in Figure 13 the flux reveral pulse is large and the make pulse is very small, whereas in Figure 14 the flux reversal pulse is too small to be visible and the make step pulse of the commutating reactor voltage is very large. At the end of the make step in both cases the break pre-excitation current rises quickly to its full value. The top of the pre-excitation current wave is now distorted because the straightener currents, as shown in Figure 6, are superimposed to pre-excitation current.

In Figure 13 we see that the current through the commutating reactor during the break step is given by an almost constant current decreasing from the beginning of the step to a minimum value and increasing again towards the end of the step. This is to imitate the shape of the magnetizing current of the commutating reactor.

In Figure 14 the step is much shorter and the pre-excitation plus the straightener current flowing through the commutating reactor is now a current raising from a minimum value at the beginning of the step to a maximum value at the end of the step. The difference in these current shapes between Figure 13 and Figure 14 is given by the low commutating voltage appearing across the reactor in Figure 13, because the rectifier operates at a high voltage and little phase delay, whereas in Figure 14 the voltage across the commutating reactor is high because the rectifier operates with a high phase delay and a low output voltage.

COMMUTATING REACTORS AND SATURABLE REACTORS

Pre-excitation circuits and flux reversal circuits for the commutating reactors of a mechanical rectifier consist of known elements like transformers, resistors, etc. and relatively new elements like commutating reactors and saturable reactors. To clarify the description and to prevent confusion of the terms, a description of the components is given herewith.

Commutating reactors and saturable reactors (transductors) are coils with ferromagnetic cores; the shape of these coils is preferably toroidal. The ferromagnetic core of commutating reactors and transductors consists of the same square loop material. This material consists of high purity nickel and high purity iron, alloyed in 48% nickel and 52% iron, with small additions of manganese to compensate for impurities like oxygen, sulphur or phosphor. These impurities must be held at a very low percentage, e. g., less than one-hundredth of one percent. The core material is rolled into a strip, with intermediate anneals, until it is 0.014 inch thick. Then the surface is pickled clean and the strip is annealed in hydrogen. Finally it is rolled down to 0.002 inch, without intermediate anneals, to give it the properties of a cold-rolled material. The nickel iron strip is wound into a core with a ceramic insulating material between the layers, e. g., magnesium oxide powder. The finished core is annealed at a temperature of 1050° C. in pure dry hydrogen.

The finished core must be treated carefully so as not to deform it mechanically. It is usually put into a rigid housing made of an insulating material like Bakelite. Around this housing the copper windings are wound. In the case of the commutating reactor, these are very large and heavy copper bars with only a few turns. In the case of the transductor, these are thin wires with many turns.

From the foregoing description it appears that there is no fundamental difference between a transductor and a commutating reactor. The only difference is in the physical dimensions and this difference is appreciable. The commutating reactor is a very large coil with a weight of several hundred pounds. It has a large iron core but only a few turns around it. Besides the main winding with few heavy turns, there are also auxiliary windings with a few turns of thin wire. The transductor is a small light coil weighing only a few pounds. It has a small iron core but the winding has many turns of a thin wire.

*Table I*

| | Commutating Reactor | Transductor |
|---|---|---|
| 1. Iron area, cm.$^2$ | 109 | 15 |
| 2. Diameter, cm | 42 | 12 |
| 3. Number of Turns | 14 | 790 |
| 4. Copper Cross-section Area, cm.$^2$ | 11 | 0.008 |
| 5. Flux Linkage Available (volt.-sec.) | 0.47 | 3.72 |
| 6. Air Inductive Flux Linkage ($V_a$) | 0.025 | 0.20 |
| 7. Resistive Drop × Time (Volt.-sec.) | 0.050 | 0.04 |
| 8. RMS Current, Ampere | 2,900 | 1.1 |
| 9. Peak Current, Ampere | 5,000 | 3 |
| 10. Magnetizing Current, Ampere | 2.8 | 0.001 |

For numerical comparison, a sample commutating reactor and transductor made for the same mechanical rectifier are shown in Table I. The iron area and the diameter of the commutating reactor, shown on lines 1 and 2 are much larger than in a transductor; actually the iron weight of the commutating reactor is about 25 times more than in the transductor. Line 3 shows the number of turns which is low in the commutating reactor, and very high in the transductor. Line 4 shows the copper cross-section area which is very large in the commutating reactor and very small in the transductor. These very different physical dimensions cause very different electrical properties of the two circuit elements which will behave very differently when they will be connected in the same electrical circuit.

A coil with an electromagnetic core, excited by an electrical voltage, in order to go from negative saturation to positive saturation requires a voltage-time integral which is equal to the total flux linkage available in the core, which is the product of flux times the number of turns expressed in volt seconds. If the product of flux times the number of turns is large, a large voltage or a large time are needed. If the flux or the number of turns is small, a small voltage or a small time are needed. For the two components under consideration, the flux linkage available is shown in line 5 because the transductor has many more turns than the commutating reactor. Its flux linkage is larger although it has a smaller iron area. Actually the flux linkage of the transductor is about 8 times larger than the flux linkage of the commutating reactor.

As a comparison, line 6 shows the air inductive flux linkage of the commutating reactor and the transductor, which is also much higher in the transductor, due to the high number of turns. On the other hand, the air inductive flux linkage is much smaller than the iron inductive flux linkage, and can be neglected. Line 7 shows the resistance drop times time, expressed in volt-seconds to compare it with flux linkage and the air inductance drop. It is also small enough to be neglected.

For practical consideration, we can assume in the future that both the commutating reactor and the transductor have no air core inductance and no resistive drop; furthermore, that the transductor has a much larger flux linkage available than the commutating reactor. In the circuits described henceforth the voltage applied from the outside will always be low enough so as not to produce complete saturation in the transductor, at least in one direction, while it is sufficient to fully saturate the commutating reactor in both directions.

Line 8 shows the R. M. S. current in amperes flowing through the windings of the commutating reactor and the transductor. Line 9 shows the peak current in amperes, and line 10 the magnetizing current in amperes in these windings. It appears that the peak current of the transductor is approximately equal to the magnetizing current of the commutating reactor, whereas the magnetizing current of the transductor is negligibly small. On the other hand, the R. M. S. current and the peak current of the commutating reactor are so large as to be completely out of proportion to the other currents. This also explains why the copper cross-section area shown on line 4 is so much larger for the commutating reactor than for the transductor.

Figure 15:
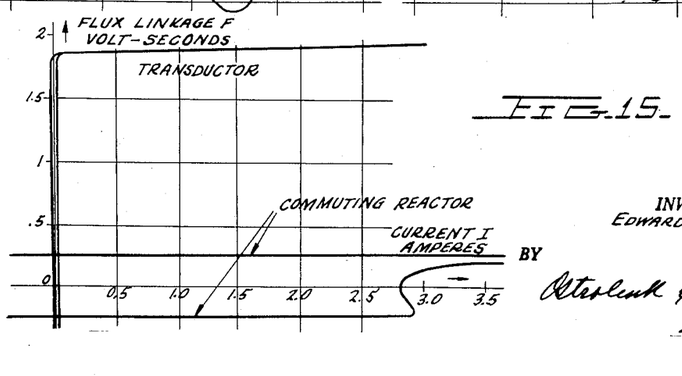
Figure 15 shows a plot of flux linkage F in volt seconds plotted against current in amperes for a commutating reactor and saturable reactor.

The electrical data of the commutating reactor and transductor for small currents have been plotted on Figure 15 which shows two diagrams, flux linkage F in volt seconds plotted against the current I in amperes. The point 0 is the point of zero flux linkage and zero current, i. e., the center point of the hysteresis loop. The vertical distances of these loops are the total flux linkage available, given on line 5. It is low for the commutating reactor and high for the transductor. The horizontal distances are the magnetizing currents of commutating reactor and transductor. It is a large current for the commutating reactor and a very small current for the transductor. For this reason the transductor curve is tall and narrow. Its current can only increase to a sizeable amount when it is completely saturated, and then the current curve is practically straight and with a slight slope due to the air inductive flux linkage indicated on line 6.

For the commutating reactor, the flux linkage is practically constant except when the core is unsaturated and then the current varies between 2.8 amperes and a saturation point which is outside of the figure. The hysteresis loop of the commutating reactor is very low and very wide with the point of complete saturation, i. e., the peak of the curve, at 5000 amperes, or approximately 1400 times further out than the right hand border of the figure. The hysteresis loop of the transductor on the other hand ends at the point of 3 amperes. The left hand side of the Figure 15 is equal to the right hand side, and not shown.

In my instant application, on a break pre-excitation circuit, and in my co-pending application Serial No. 423,358, filed April 15, 1954, on a flux reversal circuit for mechanical rectifiers, commutating reactors and transductors are connected in series. The current flows through the commutating reactor and the transductor, magnetizing these components, depending on their physical properties as described before. Voltages appearing on the circuits elements are provided by the same voltage source.

If the transformer is not saturated, the common current flowing through transductor and commutating reactor will be limited to the very small magnetizing current which is shown in Figure 15 as a very narrow loop around the vertical axis. For all practical purposes this current can be neglected. We can say that if the transductor core is not saturated, the current in the circuit will be zero.

If the transductor core is saturated, the voltage across the coil will be very low and negligible compared with the other voltages of the circuit. The transductor now passes the current freely and no voltage appears across its terminals.

From Figure 15 it appears also that the commutating reactor can unsaturate only during the time that the transductor is saturated. If both commutating reactor and transductor are saturated, then they do not oppose any appreciable impedance to the circuit and another circuit will have to take this voltage. If the commutating reactor is unsaturated, however, it will absorb a very high voltage for a limited time. While the commutating reactor is not saturated, its magnetizing current is limited, but large enough so as to be of major importance for the preexcitation or flux reversal circuit. This magnetizing current therefore cannot be neglected.

Unless special provision by a direct current bias or a direct current through the circuit are provided, the transductor will and can absorb the full voltage of the circuit and keep the currents to zero. It is a particular feature of my invention to have such a direct current superimposed to the circuit to provide saturation of the transductor at the moment it should occur.

In the foregoing, I have described my invention only in connection with preferred embodiments thereof. Many variations and modifications of the invention within the scope of the description herein are obvious. Accordingly, I prefer to be bound not by the specific disclosure herein but only by the appending claims.

I claim:

1. A mechanical rectifier comprising a pair of cooperating contacts mechanically controlled for contact engagement and disengagement; an alternating current source; a commutating reactor; said commutating reactor comprising a main commutating reactor coil and a break pre-excitation coil; said source connected through said commutating reactor coil to said cooperating contacts; and means for energizing said break pre-excitation coil after said cooperating contacts are moved to said engaged position and for de-energizing said break pre-excitation coil after said contacts are moved to said disengaged position.

2. An electrical rectifier comprising a pair of cooperating contacts having an engaged and disengaged position to rectify the current from a main alternating current source; a commutating reactor comprising a main commutating reactor coil and a break pre-excitation coil; said break pre-excitation coil energized from an alternating current source and a direct current source; said direct current source being comprised of a first and second auxiliary rectifier; said first auxiliary rectifier being energized from said main alternating current source through a saturable core transformer and an air core transformer; the primary windings of said transformer connected in series and the secondary windings of said transformers connected in series to compensate for variations of magnetizing current due to variable voltages.

3. An electrical rectifier comprising a pair of cooperating contacts having an engaged and disengaged position to rectify the current from a main alternating current source; a commutating reactor comprising a main commutating reactor coil and a break pre-excitation coil; said break pre-excitation coil energized from an alternating current source and a direct current source; said direct current source being comprised of a first and second auxiliary rectifier; said first auxiliary rectifier being energized from said main alternating current source through a saturable core transformer and an air core transformer; the primary windings of said transformer connected in series and the secondary windings of said transformers connected in series to compensate for variations of magnetizing current due to variable voltages; said second auxiliary transformer being energized by the energizing circuit of said main commutating reactor coil through an adjustable shunt resistor to thereby increase the pre-excitation current when the load current increases.

4. A mechanical rectifier comprising a pair of cooperating contacts having an engaged and disengaged position to rectify the current from a main A.-C. source; a commutating reactor comprising a main commutating reactor coil and a break pre-excitation coil; said break pre-excitation coil energized from an A.-C. source and a D.-C. source; said D.-C. source being energized to vary the energization of said break pre-excitation coil responsive to variation in the energization of said main A.-C. source to thereby compensate for variations in the magnetizing current of said commutating reactor due to the variation of said main A.-C. source.

5. A mechanical rectifier comprising a pair of cooperating contacts mechanically controlled for contact engagement and disengagement; an alternating current source; a commutating reactor; said commutating reactor comprising a main commutating reactor coil and a break pre-excitation coil; said source connected through said commutating reactor coil to said cooperating contacts; and direct current means being connected to energize said break pre-excitation coil after said cooperating contacts are moved to said engaged position and to de-energize said break pre-excitation coil after said contacts are moved to said disengaged position.

6. A mechanical rectifier comprising a pair of cooperating contacts mechanically controlled for contact engagement and disengagement; an alternating current source; a commutating reactor; said commutating reactor comprising a main commutating reactor coil and a break pre-excitation coil; said source connected through said commutating reactor coil to said cooperating contacts; said break pre-excitation winding energized from an alternating current source; said alternating current source and said break pre-excitation winding connected in parallel with a direct current source; the pre-excitation current through said pre-excitation winding being proportional to said direct current bias current.

7. A break pre-excitation circuit for a mechanical rectifier; said mechanical rectifier being constructed to energize a direct current load from an alternating current source by synchronously driving a contact connected in series with said alternating current source and direct current load into and out of engagement; commutating reactor means being connected in series with said contact for providing low current protective steps for the contact engaging and disengaging interval; said break pre-excitation circuit comprising a pre-excitation coil wound on the core of said commutating reactor; a first series path comprising said pre-excitation winding connected in series with a winding of a first saturable reactor; a second series path comprising an alternating current source connected in series with a winding of a second saturable reactor; said first and second series paths connected in parallel and energized from a direct current bias source.

8. A break pre-excitation circuit for a mechanical rectifier; said mechanical rectifier being constructed to energize a direct current load from an alternating current source by synchronously driving a contact connected in series with said alternating current source and direct current load into and out of engagement; commutating reactor means being connected in series with said contact for providing low current protective steps for the contact engaging and disengaging interval; said break pre-excitation circuit comprising a pre-excitation coil wound on the core of said commutating reactor; a first series path comprising said pre-excitation winding connected in series with a winding of a first saturable reactor; a second series path comprising an alternating current source connected in series with a winding of a second saturable reactor; said first and second series paths connected in parallel and energized from a direct current bias source; said pre-excitation winding energized by a constant current when one of said saturable reactors is unsaturated.

9. In a mechanical rectifier comprising a pair of mechanically operated contacts and a commutating reactor; a pre-excitation winding on said commutating reactor; a first series path comprising said pre-excitation winding connected in series with a winding of a first saturable reactor; a second series path comprising an alternating current source connected in series with a winding of a second saturable reactor; said first and second series paths connected in parallel and energized from a direct current bias source; said pre-excitation winding energized by a constant current when said first saturable reactor is saturated and said second saturable reactor is unsaturated; the phase relation between said alternating current source and the power supply for said rectifier controlling the time of energization of said pre-excitation winding.

10. A rectifier comprising a commutating reactor and a pair of cooperating contacts; a pre-excitation circuit for said commutating reactor comprising a first and second series path; said first path comprising a pre-excitation winding on said commutating reactor and connected in series with a first saturable reactor; said second series path comprising an alternating current source connected in series with a second saturable reactor; said first and second path connected in parallel; a constant direct current source for said parallel connect paths; said pre-excitation winding energized when said first saturable reactor is saturated and said second saturable reactor is unsaturated; said direct current source controlling the magnitude of pre-excitation current through said pre-excitation winding.

11. A rectifier comprising a commutating reactor and a pair of cooperating contacts; a pre-excitation circuit for said commutating reactor comprising a first and second series path; said first path comprising a pre-excitation winding on said commutating reactor and connected in series with a first saturable reactor; said second series path comprising an alternating current source connected in series with a second saturable reactor; said first and second path connected in parallel; a constant direct current source for said parallel connect paths; said pre-excitation winding energized when said first saturable reactor is saturated and said second saturable reactor is unsaturated; said direct current source controlling the magnitude of pre-excitation current through said pre-excitation winding; said pre-excitation winding energized after said cooperating contacts are engaged and while said contacts are being disengaged; said alternating current source determining the time when said pre-excitation winding is energized.

12. A break pre-excitation circuit for a mechanical rectifier; said mechanical rectifier being constructed to energize a direct current load from an alternating current source by synchronously driving a contact connected in series with said alternating current source and direct current load into and out of engagement; commutating reactor means being connected in series with said contact for providing low current protective steps for the contact engaging and disengaging interval; said break pre-excitation circuit comprising a pre-excitation coil wound on the core of said commutating reactor; a first series path comprising said pre-excitation winding connected in series with a winding of a first saturable reactor; a second series path comprising an alternating current source connected in series with a winding of a second saturable reactor; a straightener circuit comprising a third and fourth series path; said third series path comprising a capacitor, an inductor and a resistor; said fourth series path comprising a capacitor and a resistor; said first, second, third and fourth series path connected in parallel and energized from a direct current source.

13. A break pre-excitation circuit for a mechanical rectifier; said mechanical rectifier being constructed to energize a direct current load from an alternating current source by synchronously driving a contact connected in series with said alternating current source and direct current load into and out of engagement; commutating reactor means being connected in series with said contact for providing low current protective steps for the contact engaging and disengaging interval; said break pre-excitation circuit comprising a pre-excitation coil wound on the core of said commutating reactor; a first series path comprising said pre-excitation winding connected in series with a winding of a first saturable reactor; a second series path comprising an alternating current source connected in series with a winding of a second saturable reactor; a straightener circuit comprising a third and fourth series path; said third series path comprising a capacitor, an inductor, and a resistor; said fourth series path comprising a capacitor and a resistor; said first, second, third and fourth series path connected in parallel and energized from a direct current source; said direct current source being comprised of a first and second auxiliary rectifier; said first auxiliary rectifier being energized from a main alternating current source of the mechanical rectifier through a saturable core transformer and an air core transformer; said second auxiliary rectifier being energized from the circuit of said commutating reactor to thereby increase the pre-excitation current when the load current increases.

14. A break pre-excitation circuit for a mechanical rectifier; said mechanical rectifier being constructed to energize a direct current load from an alternating current source by synchronously driving a contact connected in series with said alternating current source and direct current load into and out of engagement; commutating reactor means being connected in series with said contact for providing low current protective steps for the contact engaging and disengaging interval; said break pre-excitation circuit comprising a pre-excitation coil wound on the core of said commutating reactor; a first series path comprising said pre-excitation winding connected in series with a winding of a first saturable reactor; a second series path comprising an alternating current source connected in series with a winding of a second saturable reactor; a bypass series circuit comprising a rheostat and a choke to bypass a predetermined amount of alternating current from said first series path; said first, second and bypass series path connected in parallel and energized from a direct current source through a choke.

15. A break pre-excitation circuit for a mechanical rectifier; said mechanical rectifier being constructed to energize a direct current load from an alternating current source by synchronously driving a contact connected in series with said alternating current source and direct current load into and out of engagement; commutating reactor means being connected in series with said contact for providing low current protective steps for the contact engaging and disengaging interval; said break pre-excitation circuit comprising a pre-excitation coil wound on the core of said commutating reactor; a first series path comprising said pre-excitation winding connected in series with a winding of a first saturable reactor; a second series path comprising an alternating current source connected in series with a winding of a second saturable reactor; a bypass series circuit comprising a rheostat and a choke to bypass a predetermined amount of alternating current from said first series path; said first, second and bypass series path connected in parallel and energized from a direct current source through a choke; said direct current source being comprised of a first and second auxiliary rectifier being energized from a main alternating current source of the mechanical rectifier through a saturable core transformer and an air core transformer; said second auxiliary rectifier being energized from the circuit of said commutating reactor to thereby increase the pre-excitation current when the load current increases.

16. A break pre-excitation circuit for a mechanical rectifier; said mechanical rectifier being constructed to energize a direct current load from an alternating current source by synchronously driving a contact connected in series with said alternating current source and direct current load into and out of engagement; commutating reactor means being connected in series with said contact for providing low current protective steps for the contact engaging and disengaging interval; said break pre-excitation circuit comprising a pre-excitation coil wound on the core of said commutating reactor; a first series path comprising said pre-excitation winding connected in series with a winding of a first saturable reactor; a second series path comprising an alternating current source connected in series with a winding of a second saturable reactor; a straightener circuit comprising a third and fourth series path; said third series path comprising a capacitor; an inductor and a resistor; said fourth series path comprising a capacitor and a resistor; a bypass series circuit comprising a rheostat and a choke to bypass a predetermined amount of alternating current from said first series path; said first, second, third and fourth and bypass circuits connected in parallel and energized from a direct current source.

17. A break pre-excitation circuit for a mechanical rectifier; said mechanical rectifier being constructed to energize a direct current load from an alternating current source by synchronously driving a contact connected in series with said alternating current source and direct current load into and out of engagement; commutating reactor means being connected in series with said contact for providing low current protective steps for the contact engaging and disengaging interval; said break pre-excitation circuit comprising a pre-excitation coil wound on the core of said commutating reactor; a first series path comprising said pre-excitation winding connected in series with a winding of a first saturable reactor; a second series path comprising an alternating current source connected in series with a winding of a second saturable reactor; a straightener circuit comprising a third and fourth series path; said third series path comprising a capacitor, an inductor and a resistor; said fourth series path comprising a capacitor and a resistor; a bypass series circuit comprising a rheostat and a choke to bypass a predetermined amount of alternating current from said first series path; said first, second, third and fourth and bypass circuits connected in parallel and energized from a direct current source through a choke; said direct current source being comprised of a first and second auxiliary rectifier; said first auxiliary rectifier being energized from a main alternating current source of the mechanical rectifier through a saturable core transformer and an air core transformer; said second auxiliary rectifier being energized from the circuit of said commutating reactor to thereby increace the pre-excitation current when the load current increases.

References Cited in the file of this patent

UNITED STATES PATENTS

| | | |
|---|---|---|
| 2,351,975 | Koppelmann | June 20, 1944 |
| 2,465,682 | Goldstein | Mar. 29, 1949 |
| 2,466,864 | Prati | Apr. 12, 1949 |
| 2,680,831 | Belamin | June 8, 1954 |
| 2,758,271 | Rolf | Aug. 7, 1956 |